Dec. 11, 1962 B. BARÉNYI 3,068,040
AUTOMOBILE BODY AND MANNER OF ASSEMBLING THE SAME
Filed Aug. 3, 1959 3 Sheets-Sheet 1

INVENTOR.
BÉLA BARÉNYI
BY
Dicke, Craig and Freudenberg
ATTORNEYS

Dec. 11, 1962   B. BARÉNYI   3,068,040
AUTOMOBILE BODY AND MANNER OF ASSEMBLING THE SAME
Filed Aug. 3, 1959   3 Sheets-Sheet 2
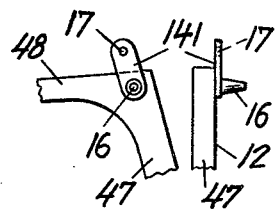
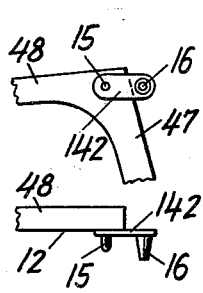
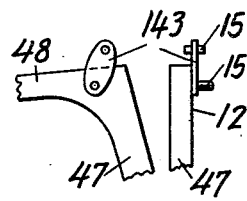
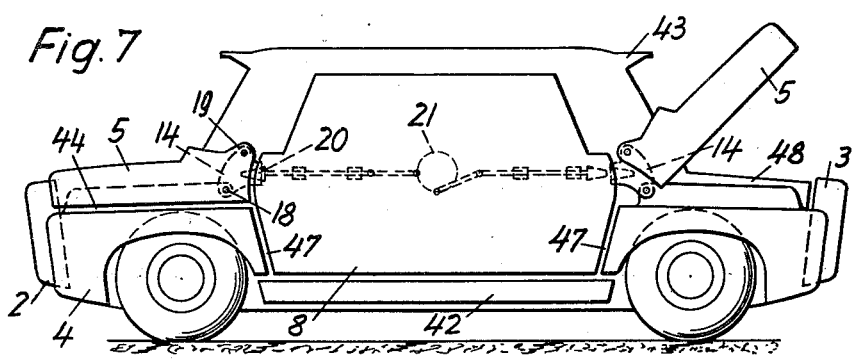
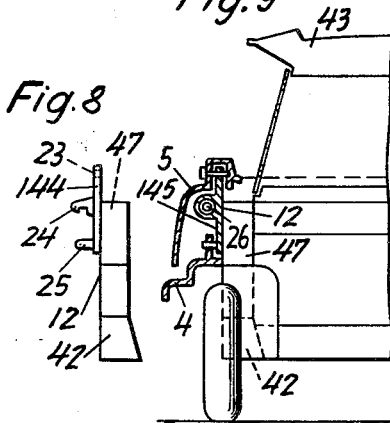
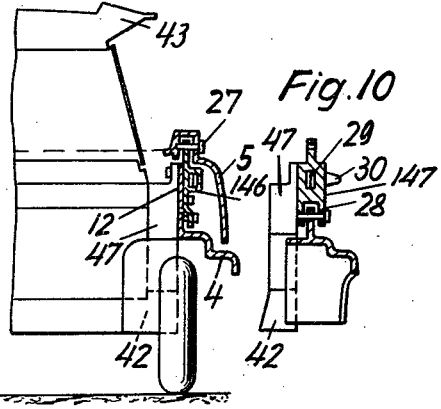
INVENTOR.
BÉLA BARÉNYI
BY
Dicke, Craig and Freudenberg
ATTORNEYS

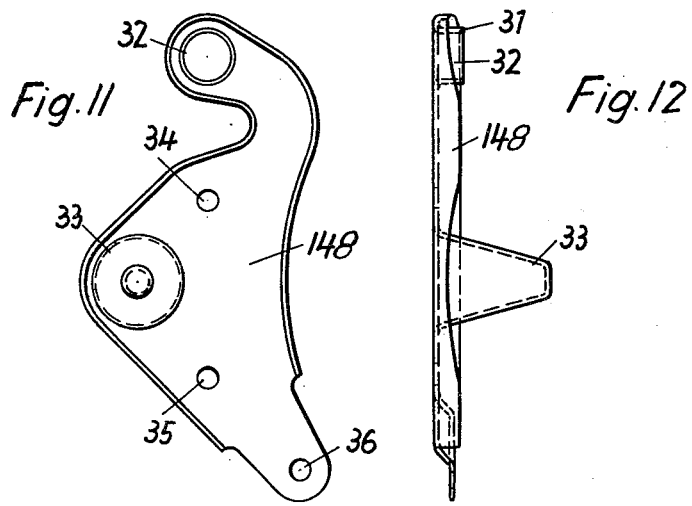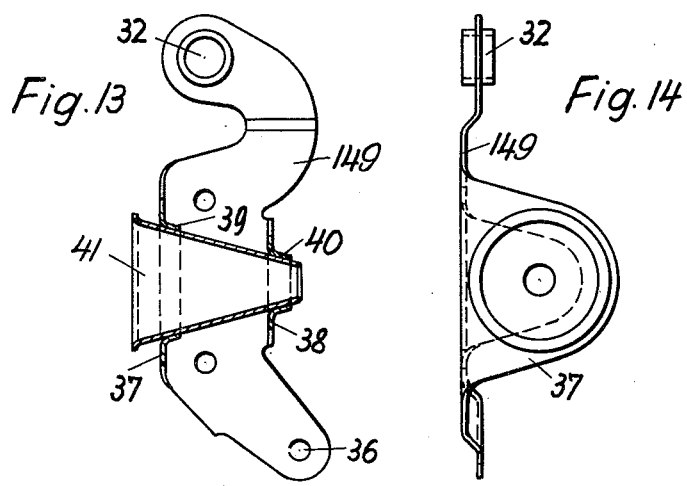

United States Patent Office 3,068,040
Patented Dec. 11, 1962

3,068,040
AUTOMOBILE BODY AND MANNER OF
ASSEMBLING THE SAME
Béla Barényi, Stuttgart-Vaihingen, Germany, assignor to Daimler-Benz Aktiengesellschaft, Stuttgart-Unterturkheim, Germany
Filed Aug. 3, 1959, Ser. No. 831,148
Claims priority, application Germany Aug. 4, 1958
13 Claims. (Cl. 296—28)

The present invention relates to new improvements in the method and manner of constructing automobile bodies, particularly of the type in which different parts of the body are separated from each other by joints.

In the manufacture of automobiles and especially of automobile bodies it has always been very difficult to construct the individual parts thereof so that, in the final assembly, the adjacent parts will be in the proper position relative to each other so as to be easily joined and also so that the joints will not be unsightly. Unfortunately this is not true in the present mass production of automobile bodies, despite the greatest possible accuracy in designing and building the necessary molding tools and assembly aids. This is due to the fact that, since all the tools have to be built within certain tolerances, these tolerances add to each other in the different parts built therewith and are further increased by the tensions and stresses of the sheet material which are often unpredictable. It has therefore hardly been possible to build two automobile bodies exactly alike in every detail, and in the final assembly of the entire car body or the entire automobile it was often necessary to resort to rather crude means such as hammers, straightening bars and the like in order to bring the various parts into a satisfactory alignment. The unsightly appearance of the uneven joints thus formed was then covered up by moulding strips and similar means so as not to be noticeable. These methods of aligning the individual body parts result not only in damage and distortion of these parts, as well as in an unsightly appearance of the unevenly fitting joints and the necessity of camouflaging them with moulding strips, but also in tensions and stresses in the individual parts themselves as well as between each other, which often assume considerable proportions and are the chief source of the squeaking noises which many cars develop almost as soon as they have been purchased.

It is the principal object of the present invention to eliminate these disadvantages. The invention is applicable particularly to car bodies in which at least some of the parts thereof are freely movable during the assembly in at least one direction, which is true, for example, with cars with front or rear end walls which are disposed within the outer contours of the car and are assembled by being fitted into the surrounding covering parts by means of angular or steplike joints.

An essential feature of the present invention consists in the provision of a connecting member which is adapted to fix the position of at least two adjacent outer parts of the car body relative to each other and to secure them to each other. These connecting members are preferably designed so that no more than two of these members are required on each longitudinal side of the car body in order to fix all of the essential body parts in the proper position relative to each other.

Another feature of the invention which is of great importance for attaining the best possible and most effective fixing or positioning effect consists in mounting each connecting member near the center of the surface area of a rectangle formed of the height H and one-half of the length L of the body parts to be assembled and secured to each other. It is most preferable to mount the connecting member according to the invention so as to be in engagement with three abutting body parts which are disposed substantially at the center of the surface area of the mentioned rectangle.

A further feature of the invention consists in mounting the connecting member either permanently or removably on the outer surface of the supporting frame of the vehicle. The outer surfaces of the supporting frame adapted to receive the connecting member are preferably flat at least at the points on which the connecting member is to be secured and preferably extend parallel to each other and to the central vertical longitudinal plane of the vehicle. These surfaces may also extend within the same plane as the surface of the strips covering the longitudinal beams of the frame.

These and other objects, features, and advantages of the present invention will become more apparent from the following detailed description thereof, particularly when read with reference to the accompanying diagrammatic drawings, in which—

FIGURES 4 to 6 show three different embodiments of the connecting member according to the invention and of the manner of mounting the same;

FIGURE 7 shows a side view similar to FIGURE 2 of a passenger car with two connecting members and a locking mechanism for the door of the car;

FIGURES 8 to 10 show cross sections of four further modifications of the connecting member according to the invention, taken in a direction vertical to the longitudinal axis of the vehicle;

FIGURES 11 and 12 show a plan view and a side view, respectively, of another embodiment of the connecting member according to the invention; while FIGURES 13 and 14 show a plan view and a side view, respectively, of a further modification of the connecting member.

Although in the accompanying drawings, the present invention is applied to a fully symmetrical passenger car 1, it is also applicable generally to any other type of car, provided that the parts which are to be fixed in position relative to each other are freely movable during the assembly in at least one direction.

Figure 1:
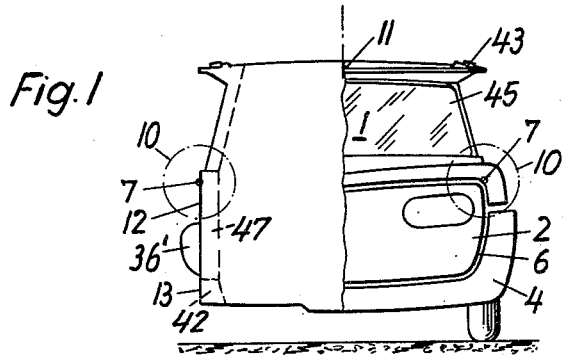
FIGURES 1, 2 and 3 show front, side, and plan views, respectively, partly in cross section, of a passenger car which is designed according to the invention, and illustrate the most suitable area within which the connecting member is to be mounted.
Figure 2:
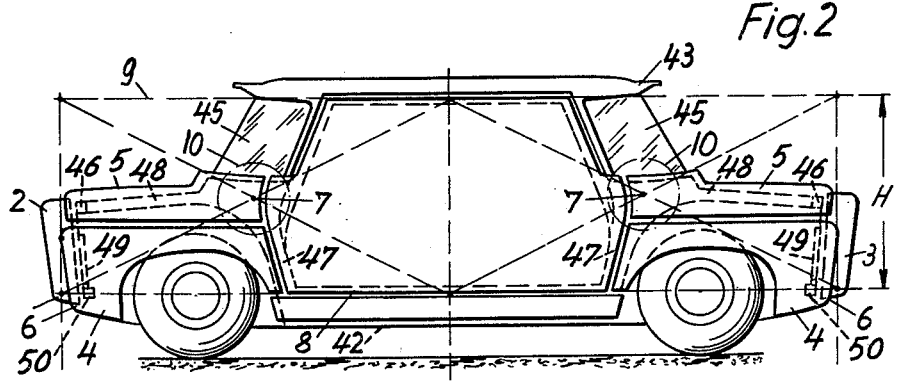
Figure 3:
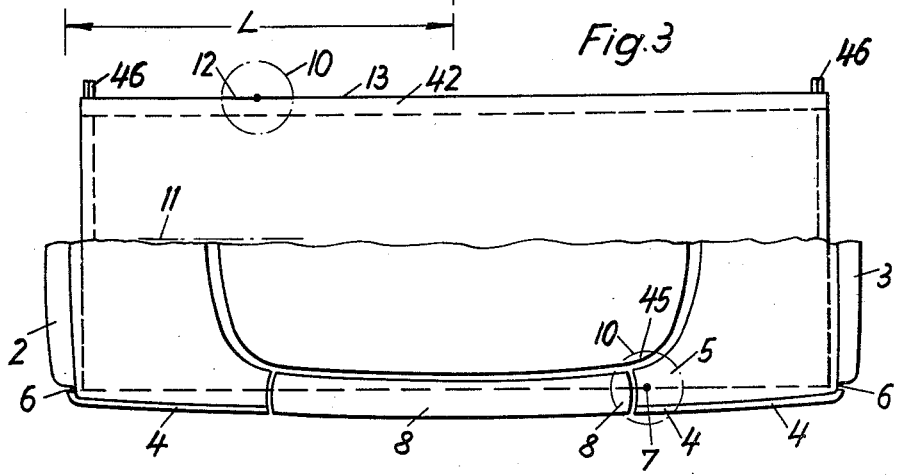

Referring first particularly to FIGURES 1 to 3, the car 1 is provided with front and rear end walls 2 and 3 which, during the assembly, are inserted into the surrounding body parts 4 and 5 so as to form intermediate joints 6 of an angular or steplike shape. The circles 10 shown in dot-and-dash lines in FIGURES 1 to 3 indicate the area surrounding the center 7 of the surface of a rectangle 9 formed of the height H and one-half of the length L of the body parts which are to be assembled and secured to each other, namely, of the front and rear fenders 4, the front and rear hoods 5, and the doors 8. These body parts 4, 5, and 8 are designed and arranged relative to each other so as to abut against each other near the center 7 of the area formed by the mentioned rectangle 9. The area defined by the circle 10 around the center 7, which also forms the area of engagement of the three body parts 4, 5, and 8, is preferably used for mounting the connecting member 14 according to the invention. This connecting member 14 is preferably secured in any conventional manner, either permanently or removably, to the outer surface 12, 13 of the supporting frame of the vehicle. The supporting frame of the vehicle is best shown somewhat diagrammatically in FIGURE 2 and includes longitudinal frame members 42 located essentially within the planes of the vehicle wheels, generally upright frame members 47 secured to members 42, further essentially longitudinal frame members 48 connected to members 47, and cross frame members such as cross pieces 46 interconnecting the longitudinal frame members 48. Further supporting parts 49 and 50 may be connected to the frame in order to facilitate the mounting of the front and rear end walls 2 and 3. The supporting frame may thus be of a type shown in my copending application Ser. No. 821,776 filed June 22, 1959, entitled "Vehicle Fender Construction." The two circles 10 as seen in side and plan views at the right side of FIGURES 2 and 3 may together be regarded as spherical. This spherical area forms the area of engagement of four adjacent body parts, since not only the fender 4, the hood 5, and the door 8 abut therein against each other, but the last two body parts, that is, hood 5 and door 8, also engage therein with the upper body part 45, that is, the structure supporting the front and rear windows and the roof of the car.

FIGURES 1 to 3 further indicate that it is especially advisable to provide two connecting members 14 at each longitudinal side of the vehicle. As previously mentioned circles 10 also encompass a part of the supporting frame of the vehicle on which the connecting member 14 is mounted, namely, the surface 12 thereof which is preferably straight and extends parallel to the corresponding surfaces at the other end and the other side of the car, and also parallel to the central vertical longitudinal plane 11 of the vehicle. Surfaces 12 of the supporting frame may also lie within the same plane as the surface 13 of the longitudinal supporting beam 42, as shown in FIGURES 1 and 3. It is, however, by no means contrary to the invention if some of the supporting parts, for example, parts 36 of the inner fender or the like, project at some other parts beyond the flat surface 12 which is adapted to receive the connecting member 14.

FIGURES 4 to 6 show plan and side views of three different embodiments of a connecting member 141, 142 or 143, respectively, in the form of a simple strap which is adapted to connect two body parts, for example, a door 8 and a hood 5, or a door 8 and a fender 4, or a fender 4 and a hood 5. For fixing the two respective body parts in the proper position relative to each other, the connecting members are provided with pins 15, cones 16, eyes 17, or the like, which mate with complementary elements associated with the outer body parts, or with the frame. The most suitable location of a connecting member depends upon the relative position of the individual body parts and the points thereof to which the connecting member is attached. The positioning or bearing points of each connecting member may therefore be disposed above each other, as shown in FIGURES 4 and 6, or side by side, as shown in FIGURE 5.

FIGURES 7 to 14 illustrate different embodiments of the invention for positioning three abutting body parts relative to each other. Thus, for example, according to FIGURE 7, the connecting members 14 fix the fenders 4, the hoods 5, and the doors 8 in the proper position relative to each other by being connected thereto at the bearing or positioning points 18, 19, and 20.

The assembly of the entire car body is preferably carried out by starting at the door or both doors 8 and proceeding from there in fitting the individual sheathing parts of one or both sides of the car by connecting the adjacent body parts 4 and 5 to door 8 by means of the connecting members 14.

The present invention is applicable with particular advantage to a car which is provided with sliding doors 8 each of which may be enclosed either by a projecting roof 43 or a face plate which is mounted on a supporting beam 42, or by both. Each of these sliding doors 8 forms substantially the entire side wall covering the interior of the car and it may be opened by first being moved outwardly from the car body and out of the door opening and by then being shifted either forwardly or rearwardly along the car body in a direction substantially parallel to the longitudinal axis of the car. In the closed position, door 8 is preferably locked to the connecting member 14 preferably at a point adjacent to the plane of the horizontal joint 44 between hood 5 and fender 4. As illustrated in FIGURE 7, door 8 is preferably locked at both sides to the adjacent connecting members 14 by means of sliding bolts with positioning cones 20 thereon which are shifted horizontally by a common crank mechanism 21 so as to engage into corresponding conical apertures in the connecting members 14. Each of the hoods 5 which extends over the entire width of the car is pivotably secured to the connecting member 14 at a point adjacent to and preferably above the plane of the positioning cones 20 of the door lock so as to be pivotable in the upward direction, as shown at the right side of FIGURE 7, in order to open the engine or trunk compartment. The positioning point 18 on connecting member 14, for the fender 4, on which these two parts may also be rigidly secured to each other, may also be disposed at a point adjacent to but preferably below the plane of the positioning cones 20 of the door lock.

FIGURES 8 to 10 illustrate special modifications of the connecting member. The connecting member 144 according to FIGURE 8 forms a substantially flat plate which has an aperture 23 near its upper end for pivotably securing hood 5 thereto, and a beveled or conical positioning and locking pin 24 at a central point for locking the door, and a straight pin 25 near its lower end for positioning and securing the fender 4. FIGURE 9 shows a further modification wherein the connecting member 145 is substantially similar to that shown in FIGURE 8. It differs therefrom only insofar as it has a conical aperture 26 for receiving the conical locking bolt of the door. The modification of the connecting member shown in FIG. 9a discloses a bolt 27 securing the hood 5 to the connecting member 146 and a rectangular aperture similar to the aperture 29 of FIGURE 10 serving as a catch for receiving the locking bolt of the door. FIGURE 10 illustrates a connecting member 147 the lower part 28 of which is bifurcated so as to form two arms which enclose and position the upper edge of the fender 4 and are rigidly secured thereto. This connecting member has a rectangular aperture 29 serving as a catch for receiving the locking bolt and a conical pin 30 extending in a direction at right angles to the vertical longitudinal plane of the vehicle for positioning the door.

FIGURES 11 to 14 shown plan and side views of two further embodiments of the connecting member. These connecting members 148 and 149 are made of a shape and material so as to permit each of them to be preferably produced in a single operation by being stamped out of sheet metal and at the same time being deep-drawn. Thus, is this same stamping operation, the connecting member 148 according to FIGURES 11 and 12 is cut out and molded to the shape as shown and provided with a flange or collar 31 with an eye 32 therein to which the hood 5 is to be connected, further with the conical socket part 33 for positioning the door, and with the holes 34 and 35 for removably securing the connecting member 148 to the upper frame of the vehicle, and the hole 36 for positioning and securing the fender 4. As previously mentioned, the connecting member 148 may be further provided with a locking device, for example, a latch or catch for receiving the locking bolt.

FIGURES 13 and 14 illustrate a further connecting member 149 which consists of a sheet-metal plate with two projecting, substantially triangular portions 37 and 38 which are bent upwardly at right angles, and each of which is provided with a flange 39 and 40, respectively, for receiving a conical socket 41 for receiving the conical positioning pin of the door.

The particular position in which the connecting member is mounted within the car body may be varied in accordance with the particular construction and design thereof and the number of body parts to be connected to each other. Thus, for example, it may happen that the connecting member is to be mounted near the front or rear end of the vehicle.

In any event, however, the most suitable location of the area 10 around the surface center 7, as indicated in FIGURES 1 to 3, is at a point where not only the door, the hood and the fender, as seen in a side view, fall within this area but where also the joint between the door and/or the hood with the upper body 45, as seen in a plan view, fall within this area 10.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In an automobile, the combination comprising a support frame, an automobile body including a plurality of outer body members spaced from each other by joints, one of said body members having an offset edge portion extending behind an adjacent body member at one of said joints, at least some of said body members being freely movable during the assembly of said body in at least one direction when substantially in position adjacent the support frame and prior to being fixedly positioned, a single connecting member mounted on said frame for fixing at least two adjacent body members in the proper position relative to each other and for securing them to each other, said connecting member being generally flat and being provided at spaced points thereupon with positioning members, each of said positioning members engaging complementary positioning means of a respective one of said adjacent body members to fixedly position the adjacent body members, one of said complementary positioning means being located at said offset portion behind an adjacent body member.

2. An automobile as defined in claim 1, in which two connecting members are provided at each longitudinal side of said body for positioning all of said body members relative to each other and for securing them to each other.

3. An automobile as defined in claim 1, in which said connecting member is mounted within an area adjacent to the center of a surface substantially forming a rectangle composed of the height and one-half of the length of the body members to be connected to each other.

4. An automobile as defined in claim 1, in which said connecting member is mounted within an area in which three of said body members abut against each other, said connecting member being adapted to position said three members relative to each other and to secure them to each other.

5. An automobile as defined in claim 4, in which said three body members abut against each other within an area adjacent to the center of a surface substantially forming a rectangle composed of the height and one-half of the length of the body members to be connected to each other.

6. An automobile as defined in claim 1, further comprising a longitudinal beam at each side of and underneath said body for supporting the same, the outer surface of at least the part of said upper frame to which each of said connecting members is secured on each side of said body lying within the plane formed by the outer surface of one of said beams.

7. In an automobile the combination comprising a support frame, a plurality of outer body members separated from each other by joints, at least some of said joints being formed by angularly offset body members, at least some of said body members being freely movable during the assembly of said body in at least one direction when substantially in position adjacent the support frame and prior to being fixedly positioned, a single connecting member mounted on said frame for fixing at least two adjacent body members on each side of said body in the proper position relative to each other and for securing them to each other, said two body members consisting of a hood and a door, associated locking means on said door and on said connecting member, and associated means on said hood and on said connecting member for pivotably securing said hood to said connecting member, said pivoting means being disposed on said connecting member within a plane above said locking means.

8. In an automobile the combination comprising a support frame, a plurality of outer body members separated from each other by joints, at least some of said joints being formed by angularly offset body members, at least some of said body members being freely movable during the assembly of said body in at least one direction when substantially in position adjacent the support frame and prior to being fixedly positioned, a single connecting member mounted on said frame for fixing at least two adjacent body members on each side of said body in the proper position relative to each other and for securing them to each other, said two body members consisting of a door and a fender, associated locking means on said door and on said connecting member, and associated means on said connecting member and on said fender for positioning said fender relative to said door and for securing the same to each other, said positioning and securing means being disposed on said connecting member within a plane underneath said locking means.

9. An automobile as defined in claim 8, in which said locking means on said connecting member comprise a conical aperture in said member.

10. An automobile as defined in claim 8, in which said locking means on said connecting member comprise a door catch in said member.

11. An automobile as defined in claim 8, in which said fender positioning and securing means on said connecting member comprise a pair of arms on the lower part of said member enclosing the upper edge portion of said fender, and means extending transversely through said arms and said edge portion for securing the same to each other.

12. In an automobile the combination comprising a support frame, a plurality of outer body members separated from each other by joints, at least some of said joints being formed by angularly offset body members, at least some of said body members being freely movable during the assembly of said body in at least one direction when substantially in position adjacent the support frame and prior to being fixedly positioned, a single connecting member mounted on said frame for fixing adjacent body members on each side of said body in the proper position relative to each other and for securing them to each other, said adjacent body members including a door, a fender, and a hood, associated locking means on said door and on said connecting member, associated means on said hood and on said connecting member for pivotably securing said hood to said connecting member, and associated means on said fender for positioning said fender relative to said door and said hood and for securing the same to each other, said connecting member comprising a substantially flat plate, said pivoting means on said connecting member comprising an eye in the upper part of said member, said locking means on said connecting member comprising a conical pin on the central part of said member, said fender positioning and securing means on said connecting member comprising a pin in the lower part of said member.

13. In an automobile the combination comprising a support frame, a plurality of outer body members separated from each other by joints, at least some of said joints being formed by angularly offset body members, at least some of said body members being freely movable during the assembly of said body in at least one direction when substantially in position adjacent the support frame and prior to being fixedly positioned, a single connecting member mounted on said frame for fixing at least two adjacent body members on each side of said body in the proper position relative to each other and for securing them to each other, said connecting member consisting of a sheet-metal plate having two projecting portions bent at right angles to said plate and being of a substantially triangular shape with an aperture therein, and a hollow conical member inserted into and secured to said apertures in said projecting portions.

References Cited in the file of this patent

UNITED STATES PATENTS

| | | |
|---|---|---|
| 1,644,826 | Goddard | Oct. 11, 1927 |
| 1,928,523 | Bally | Sept. 26, 1933 |
| 2,612,233 | Newell | Sept. 30, 1952 |
| 2,886,373 | Barenyi | May 12, 1959 |
| 2,953,409 | Barenyi | Sept. 20, 1960 |

FOREIGN PATENTS

| | | |
|---|---|---|
| 551,119 | Belgium | Oct. 15, 1956 |

(U.S. corresponding—2,988,397—June 13, 1961)

| | | |
|---|---|---|
| 859,117 | Germany | Dec. 11, 1952 |